United States Patent
Kan et al.

(10) Patent No.: US 12,393,467 B2
(45) Date of Patent: Aug. 19, 2025

(54) DATA PROCESSING METHOD AND APPARATUS, DISTRIBUTED DATA FLOW PROGRAMMING FRAMEWORK, AND RELATED COMPONENT

(71) Applicant: INSPUR SUZHOU INTELLIGENT TECHNOLOGY CO., LTD., Jiangsu (CN)

(72) Inventors: Hongwei Kan, Jiangsu (CN); Nan Wu, Jiangsu (CN); Rengang Li, Jiangsu (CN); Yanwei Wang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 678 days.

(21) Appl. No.: 17/781,317

(22) PCT Filed: Apr. 27, 2020

(86) PCT No.: PCT/CN2020/087157
§ 371 (c)(1),
(2) Date: May 31, 2022

(87) PCT Pub. No.: WO2021/155642
PCT Pub. Date: Aug. 12, 2021

(65) Prior Publication Data
US 2023/0004433 A1    Jan. 5, 2023

(30) Foreign Application Priority Data
Feb. 5, 2020 (CN) .......................... 202010080853.6

(51) Int. Cl.
*G06F 9/50* (2006.01)
*G06F 15/173* (2006.01)

(52) U.S. Cl.
CPC ........ *G06F 9/505* (2013.01); *G06F 15/17331* (2013.01)

(58) Field of Classification Search
CPC .... G06F 9/505; G06F 15/7889; G06F 9/5027; G06F 2209/5017; G06F 2209/509; Y02D 10/00
See application file for complete search history.

(56) References Cited

U.S. PATENT DOCUMENTS 10,719,517 B1 * 7/2020 Li ..................... G06F 16/24561
10,868,707 B1 * 12/2020 Friedman ................ H04L 69/16
(Continued)

FOREIGN PATENT DOCUMENTS

| CN | 103345461 A | 10/2013 |
|---|---|---|
| CN | 105183683 A | 12/2015 |

(Continued)

OTHER PUBLICATIONS

Unknown Author, "OpenFlow Switch Specification—Version 1.0.0", Dec. 2009 (Year: 2009).*
(Continued)

*Primary Examiner* — Duy Khuong T Nguyen
*Assistant Examiner* — Kevin X Lu
(74) *Attorney, Agent, or Firm* — Cooper Legal Group, LLC (57) ABSTRACT

A data processing method, a data processing apparatus, a distributed data flow programming framework, an electronic device, and a storage medium. The data processing method includes: dividing a data processing task into a plurality of data processing subtasks (S101); determining, in a Field Programmable Gate Array (FPGA) accelerator side, a target FPGA acceleration board corresponding to each of the data processing subtasks (S102); and sending data to be computed to the target FPGA acceleration board, and executing (Continued)

the corresponding data processing subtask by use of each of the target FPGA acceleration boards to obtain a data processing result (S103). According to the method, a physical limitation of host interfaces on the number of FPGA acceleration boards in an FPGA accelerator side may be avoided, thereby improving the data processing efficiency.

16 Claims, 6 Drawing Sheets

(56) References Cited

U.S. PATENT DOCUMENTS

| | | | |
|---|---|---|---|
| 2008/0148227 | A1 | 6/2008 | McCubbrey |
| 2015/0058614 | A1* | 2/2015 | Degenaro .............. G06F 9/5027 713/100 |
| 2015/0143003 | A1* | 5/2015 | Trout ...................... G06F 13/28 710/308 |
| 2017/0262567 | A1 | 9/2017 | Vassiliev |
| 2019/0155239 | A1* | 5/2019 | Salhuana ................ G06F 8/456 |
| 2019/0213029 | A1 | 7/2019 | Liu et al. |
| 2020/0073849 | A1* | 3/2020 | Dormitzer ............... G06F 13/28 |
| 2020/0104269 | A1* | 4/2020 | Pope ..................... G06F 9/5077 |
| 2020/0226124 | A1* | 7/2020 | Chishti ............... G06F 16/9024 |
| 2020/0265052 | A1* | 8/2020 | Fujikawa ............ G06F 16/2282 |

FOREIGN PATENT DOCUMENTS

| | | |
|---|---|---|
| CN | 106354574 A | 1/2017 |
| CN | 107273331 A | 10/2017 |
| CN | 108319563 A | 7/2018 |
| CN | 108776648 A | 11/2018 |
| CN | 108776649 A | 11/2018 |
| CN | 109739833 A | 5/2019 |
| CN | 109787918 A | 5/2019 |
| CN | 110069441 A | 7/2019 |
| CN | 110083558 A | 8/2019 |
| CN | 110399221 A * | 11/2019 |
| CN | 110519090 A | 11/2019 |
| CN | 110618871 A | 12/2019 |
| CN | 110619595 A | 12/2019 |

OTHER PUBLICATIONS

Unknown Author, "TCP—How are Mac addresses used in routing packets?", , stackoverflow.com/questions/23935095/how-are-mac-addresses-used-in-routing-packets, May 2014 (Year: 2014).*
International Search Report of corresponding PCT application PCT/CN2020/087157, mailed Nov. 11, 2020, 6 pages.
Written Opinion of International Searching Authority of corresponding PCT application PCT/CN2020/087157, mailed Nov. 11, 2020, 9 pages.
First Office Action of corresponding CN priority application 202010080853.6, mailed Feb. 1, 2021, 15 pages.
Reasons for Refusal cited in JP 2022-532624 mailed Nov. 1, 2022, 10 pages.
Reasons for Refusal cited in JP 2022-532624 mailed May 1, 2023, 10 pages.
Communication pursuant to Article 94 cited in EP 20917386.3, mailed Apr. 15, 2024, 9 pages.
European Search Report cited in EP 20917386.3, mailed Jun. 15, 2023, 12 pages.

* cited by examiner

DATA PROCESSING METHOD AND APPARATUS, DISTRIBUTED DATA FLOW PROGRAMMING FRAMEWORK, AND RELATED COMPONENT

The present application claims priority to Chinese Patent Application No. 202010080853.6, filed to the Patent Office of the People's Republic of China on Feb. 5, 2020, and entitled "Data Processing Method and Apparatus, Distributed Data Flow Programming Framework, and Related Component", the contents of which are hereby incorporated by reference in its entirety.

FIELD

The present application relates to the technical field of cloud computing, and particularly to a data processing method and apparatus, a distributed data flow programming framework, an electronic device, and a storage medium.

BACKGROUND

With the rapid development of Artificial Intelligence (AI) and big data, data in a data center has been multiplied. Meanwhile, the rapid development of AI also brings requirements for high performance computing of data. As a result, data grows exponentially on one hand, on the other hand the computing resources needed for processing the data increases correspondingly. Conventional computing is implemented by a Central Processing Unit (CPU). With the constant development of technology, the performance of the CPU cannot be improved exponentially. A reconfigurable chip, such as a Field Programmable Gate Array (FPGA), has the potential to accelerate many workloads, and may perform decryption operation, image processing, decompression, and AI related computing. In related arts, communication-intensive and computing-intensive tasks are processed by an FPGA accelerator side. However, when data interaction is needed between two FPGA acceleration boards in the FPGA accelerator side in the related arts, the FPGA acceleration board needs to send data to a host side by Peripheral Component Interconnect Express (PCIE), and then the host side sends the data to the other board. As a result, the data computing efficiency is relatively low, and the number of boards capable of supporting PCIE at the host side forms a physical limitation on the number of devices supporting a plurality of boards in an FPGA cloud server.

Therefore, how to avoid a physical limitation of host interfaces on the number of FPGA acceleration boards in an FPGA accelerator side to improve the data processing efficiency is a technical problem needed to be solved by a person skilled in the art at present.

SUMMARY

An objective of the present application is to provide a data processing method and apparatus, a distributed data flow programming framework, an electronic device, and a storage medium, which may avoid a physical limitation of host interfaces on the number of FPGA acceleration boards in an FPGA accelerator side, thereby improving the data processing efficiency.

In order to solve the foregoing technical problem, the present application provides a data processing method for applying to a host side, wherein the host side is connected to a Field Programmable Gate Array (FPGA) accelerator side, the FPGA accelerator side comprises a plurality of FPGA acceleration boards, and the FPGA acceleration boards are connected to each other through a network, the data processing method comprising:

dividing a data processing task into a plurality of data processing subtasks, and determining, in the FPGA accelerator side, target FPGA acceleration boards corresponding to each of the data processing subtasks; and sending data to be computed to the target FPGA acceleration boards, and executing the corresponding data processing subtask by use of each of the target FPGA acceleration boards to obtain a data processing result, wherein the data processing result comprises intermediate computing data or a final processing result of the data processing task, source data of each of the data processing subtasks comprises the data to be computed and/or the intermediate computing data, and the intermediate computing data is transmitted through the network between the target FPGA acceleration boards.

Optionally, after the sending data to be computed to the target FPGA acceleration boards, the method further includes:

configuring a data address and data length of the data to be computed into the target FPGA acceleration boards, whereby the target FPGA acceleration boards store the data to be computed according to the data address and the data length.

Optionally, the method further includes:

configuring a computation result storage address into the target FPGA acceleration boards, whereby the target FPGA acceleration boards store the intermediate computing data and/or the final processing result into the computation result storage address.

Optionally, the method further includes:

selecting a first target FPGA acceleration board from all of the target FPGA acceleration boards;

sending all of the data processing subtasks and task distribution information to the first target FPGA acceleration board; wherein the task distribution information comprising correspondences between the data processing subtasks and the target FPGA acceleration boards; and sending, by use of the first target FPGA acceleration board, the data processing subtasks to the corresponding target FPGA acceleration boards according to the task distribution information.

Optionally, after the sending data to be computed to the target FPGA acceleration boards, the method further includes:

selecting a second target FPGA acceleration board from all of the target FPGA acceleration boards;

sending all of the data to be computed and data distribution information to the second target FPGA acceleration board; wherein the data distribution information comprising correspondences between the data to be computed and the target FPGA acceleration boards; and sending, by use of the second target FPGA acceleration board, the data to be computed to the corresponding FPGA acceleration boards according to the data distribution information.

Optionally, after the sending data to be computed to the target FPGA acceleration boards, the method further includes:

sending the corresponding data to be computed to the target FPGA acceleration boards in a self-defined Remote Direct Memory Access (RDMA) transmission mode; and sending the corresponding data processing subtask to the target FPGA acceleration boards in a preset transmission mode; wherein the preset transmission mode comprising streaming or integral packet transmission.

Optionally, the method further includes:

when the target FPGA acceleration boards sends the intermediate computing data to other target FPGA acceleration boards based on the network, sending a data address and data length of the intermediate computing data to the other target FPGA acceleration boards, whereby the other target FPGA acceleration boards store the intermediate computing data according to the data address and data length of the intermediate computing data.

Optionally, data is transmitted between the target FPGA acceleration boards by a Medium Access Control (MAC) interface; data is transmitted between the host side and the target FPGA acceleration boards by a Peripheral Component Interconnect Express (PCIE) interface; and data is transmitted between a remote device and the target FPGA acceleration boards by a MAC interface.

Optionally, when the host side and the target FPGA acceleration boards are devices in a local area network, a packing operation is performed in a MAC layer on communication data between the host side and the target FPGA acceleration boards; and when the host side and the target FPGA acceleration boards are devices in a public network, a packing operation is performed in a User Datagram Protocol (UDP) payload layer on communication data between the host side and the target FPGA acceleration boards, and a packing operation is performed in the UDP payload layer on communication data between the target FPGA acceleration boards.

The present application further provides a data processing apparatus. The data processing apparatus is connected to a Field Programmable Gate Array (FPGA) accelerator side, the FPGA accelerator side comprises a plurality of FPGA acceleration boards, and the FPGA acceleration boards are connected to each other through a network, the data processing apparatus comprises:

a task distribution module, configured for dividing a data processing task into a plurality of data processing subtasks, and determining, in the FPGA accelerator side, a target FPGA acceleration boards corresponding to each of the data processing subtasks; and a task execution module, configured for sending data to be computed to the target FPGA acceleration boards, and executing the corresponding data processing subtask by use of each of the target FPGA acceleration boards to obtain a data processing result, wherein the data processing result comprises intermediate computing data or a final processing result of the data processing task, source data of each of the data processing subtasks comprises the data to be computed and/or the intermediate computing data, and the intermediate computing data is transmitted through the network between the target FPGA acceleration boards.

The present application further provides a distributed data flow programming framework, including a Central Processing Unit (CPU) acceleration stack and a Field Programmable Gate Array (FPGA) acceleration stack;

the CPU acceleration stack is configured to provide an underlying support for dividing a data processing task, and is further configured to provide a host-side Application Programming Interface (API) for scheduling a data processing subtask;

the FPGA acceleration stack is configured to provide an acceleration interface corresponding to the host-side API, and is further configured to provide an acceleration data control program and a kernel control program during the execution of the data processing subtask;

wherein when the distributed data flow programming framework is operating, the CPU acceleration stack divides the data processing task into a plurality of data processing subtasks, and determines, in an FPGA accelerator side, target FPGA acceleration boards corresponding to each of the data processing subtasks; and sends data to be computed to the target FPGA acceleration boards; and the FPGA acceleration stack executes the corresponding data processing subtask by use of each of the target FPGA acceleration boards to obtain a data processing result, wherein the data processing result comprises intermediate computing data or a final processing result of the data processing task, source data of each of the data processing subtasks comprises the data to be computed and/or the intermediate computing data, and the intermediate computing data is transmitted through the network between the target FPGA acceleration boards.

Optionally, the FPGA acceleration stack includes:

a static region, configured to execute the data processing subtask distributed by the CPU acceleration stack, and further configured to send the data processing result to the CPU acceleration stack or another target FPGA acceleration board; and an FPGA acceleration engine, configured to send the data processing subtask to a local acceleration unit or an acceleration unit of other target FPGA acceleration boards to perform an accelerated computation operation.

A storage medium, characterized by storing computer-executable instructions thereon which, when loaded and executed by a processor, implements the steps of the above data processing method.

The present application also provides an electronic device, including a memory and a processor, wherein the memory has a computer program stored thereon; and the processor, when calling the computer program stored in the memory, implements the steps of the above data processing method.

The present application further provides a data processing method for applying to a host side, wherein the host side is connected to a Field Programmable Gate Array (FPGA) accelerator side, the FPGA accelerator side comprises a plurality of FPGA acceleration boards, and the FPGA acceleration boards are connected to each other through a network, the data processing method comprises: dividing a data processing task into a plurality of data processing subtasks, and determining, in the FPGA accelerator side, target FPGA acceleration boards corresponding to each of the data processing subtasks; and sending data to be computed to the target FPGA acceleration boards, and executing the corresponding data processing subtask by use of each of the target FPGA acceleration boards to obtain a data processing result, wherein the data processing result comprises intermediate computing data or a final processing result of the data processing task, source data of each of the data processing subtasks comprises the data to be computed and/or the intermediate computing data, and the intermediate computing data is transmitted through the network between the target FPGA acceleration boards.

According to the present application, the data processing task is divided into the a plurality of data processing subtasks first. Then, the target FPGA acceleration boards corresponding to each of the data processing subtasks are determined in the FPGA accelerator side. The corresponding data processing subtask is executed by use of the target FPGA acceleration boards. When the target FPGA acceleration boards process the data processing subtask, the data processing result of other target FPGA acceleration boards may be taken as input data, and the data processing result computed by itself may also be sent to other target FPGA acceleration boards. The data processing result is transmitted between the target FPGA acceleration boards by the network rather than sent to the host side first and then forwarded by the host side. It can be seen that, according to the present application, a physical limitation of host interfaces on the number of FPGA acceleration boards in an FPGA accelerator side may be avoided, thereby improving the data processing efficiency. The present application also provides a data processing apparatus, a distributed data flow programming framework, an electronic device, and a storage medium, which have the foregoing beneficial effects. Elaborations are omitted herein.

BRIEF DESCRIPTION OF THE DRAWINGS

In order to describe the technical solutions in the embodiments of the present application or the conventional art more clearly, the drawings needed to be used in descriptions about the embodiments or the conventional art will be simply introduced below. It is apparent that the drawings described below are merely some embodiments of the present application. Other drawings may further be obtained by those of ordinary skill in the art according to these drawings without creative work.

DETAILED DESCRIPTION

The technical solutions in the embodiments of the present application will be clearly and completely described below with reference to the accompanying drawings in the embodiments of the present application. Obviously, the described embodiments are only a part of the embodiments of the present application, rather than all the embodiments. Based on the embodiments of the present application, all other embodiments obtained by those skilled in the art without creative work shall fall within the protection scope of the present application.

Figure 1:
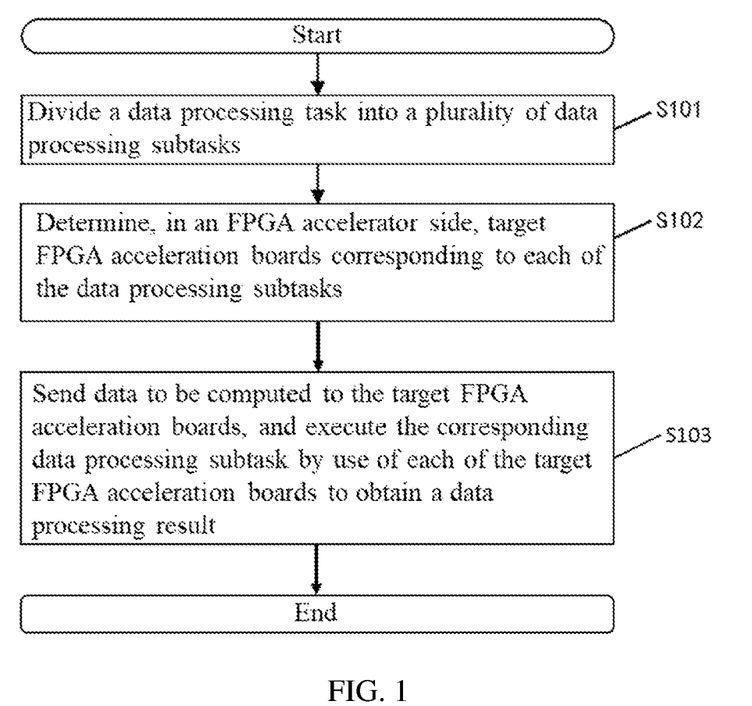
FIG. 1 is a flowchart of a data processing method according to an embodiment of the present application.

References are made to FIG. 1 below, which is a flowchart of a data processing method according to an embodiment of the present application.

The following specific steps may be included.

At S101, a data processing task is divided into a plurality of data processing subtasks.

The present embodiment is applicable to a host side connected with an FPGA accelerator side. The FPGA accelerator side includes a plurality of FPGA acceleration boards. The FPGA acceleration boards are connected to each other through a network. A CPU (Central Processing Unit) in the host side may be configured to implement the division of data processing subtasks.

Specifically, in the present embodiment, data to be computed and all computation operations for the data to be computed may be determined according to the data processing task. In the present embodiment, the data processing task may be divided into a plurality of data processing subtasks according to the number of the computation operations and/or types of the computation operations. For example, a data processing task includes nine steps of computation operations, wherein the first to third computation operations may be divided as a first data processing subtask, the fourth to sixth computation operations may be divided as a second data processing subtask, and the seventh to ninth computation operations may be divided as a third data processing subtask. For another example, a data processing task includes three types of computation operations, i.e., lexical analysis, semantic analysis, and hash mapping, wherein all lexical analysis operations may be divided as a fourth data processing subtask, all semantic analysis operations may be divided as a fifth data processing subtask, and all hash mapping operations may be divided as a sixth data processing subtask.

It can be understood that, after the plurality of data processing subtasks are obtained, firmware corresponding to each of the data processing subtasks may be generated for burning to the corresponding FPGA acceleration boards, such that the FPGA acceleration boards execute a corresponding data processing operation by executing the firmware.

At S102, target FPGA acceleration boards corresponding to each of the data processing subtasks are determined in a FPGA accelerator side.

The FPGA accelerator side may include a plurality of FPGA acceleration boards. In the present embodiment, the same number of FPGA acceleration boards may be selected from the FPGA accelerator side according to the subtask number of the data processing subtasks. After the target FPGA acceleration boards are determined, a correspondence between each of the target FPGA acceleration boards and a data processing subtask may further be determined, and the data processing subtask is sent to the corresponding target FPGA acceleration boards based on the correspondence, namely the firmware corresponding to the data processing subtask is burnt to the corresponding target FPGA acceleration board.

At S103, data to be computed is sent to the target FPGA acceleration boards, and the corresponding data processing subtask is executed by use of each of the target FPGA acceleration boards to obtain a data processing result.

In the present embodiment, corresponding data to be computed may be determined according to the data processing task, and the data to be computed is sent to the target FPGA acceleration boards. It can be understood that source data during the execution of the data processing subtask by the target FPGA acceleration boards may be the data to be computed, or an intermediate computing result of other target FPGA acceleration board, or the data to be computed and the intermediate computing result. The data processing result obtained from executing the corresponding data processing subtask by each of the target FPGA acceleration boards may include intermediate computing data and/or a final processing result of the data processing task. Source data of each of the data processing subtasks includes the data to be computed and/or the intermediate computing data. The intermediate computing data is transmitted by the network between the target FPGA acceleration boards.

As a possible implementation mode, after the data to be computed is sent to the target FPGA acceleration boards, a data address and data length of the data to be computed may further be configured into the target FPGA acceleration boards, whereby the target FPGA acceleration boards store the data to be computed according to the data address and the data length. In the above-mentioned implementation mode, the host side sends the data address and data length of the data to be computed to the target FPGA acceleration boards, whereby the target FPGA acceleration boards store the data to be computed according to the data address and the data length.

As other possible implementation mode, the host side may also configure a computation result storage address into the target FPGA acceleration board, whereby the target FPGA acceleration boards store the intermediate computing data and/or the final processing result into the computation result storage address. In the above-mentioned implementation mode, the host side sends the computation result storage address to the target FPGA acceleration boards, whereby the target FPGA acceleration boards store the intermediate computing data and/or the final processing result according to the computation result storage address, other target FPGA acceleration boards may read the intermediate computing data according to the computation result storage address, and the host side may read the final processing result according to the computation result storage address.

When the target FPGA acceleration boards send the intermediate computing data to other target FPGA acceleration board based on the network, a data address and data length of the intermediate computing data may be sent to the other target FPGA acceleration boards, whereby the other target FPGA acceleration boards store the intermediate computing data according to the data address and data length of the intermediate computing data. Specifically, the intermediate computing data may be transmitted between the target FPGA acceleration boards by a MAC interface. The final processing result and/or the data to be computed may be transmitted between the host side and the target FPGA acceleration board by a PCIE interface. Data may be transmitted between a remote device and the target FPGA acceleration board by a MAC interface.

According to the present embodiment, the data processing task is divided into the a plurality of data processing subtasks first. Then, the target FPGA acceleration boards corresponding to each of the data processing subtasks are determined in the FPGA accelerator side. The corresponding data processing subtask is executed by use of the target FPGA acceleration boards. When the target FPGA acceleration boards process the data processing subtask, the data processing result of other target FPGA acceleration boards may be taken as input data, and the data processing result computed by itself may also be sent to other target FPGA acceleration boards. The data processing result is transmitted between the target FPGA acceleration boards by the network rather than sent to the host side first and then forwarded by the host side. It can be seen that, according to the present embodiment, a physical limitation of host interfaces on the number of FPGA acceleration boards in an FPGA accelerator side may be avoided, thereby improving the data processing efficiency.

Figure 2:
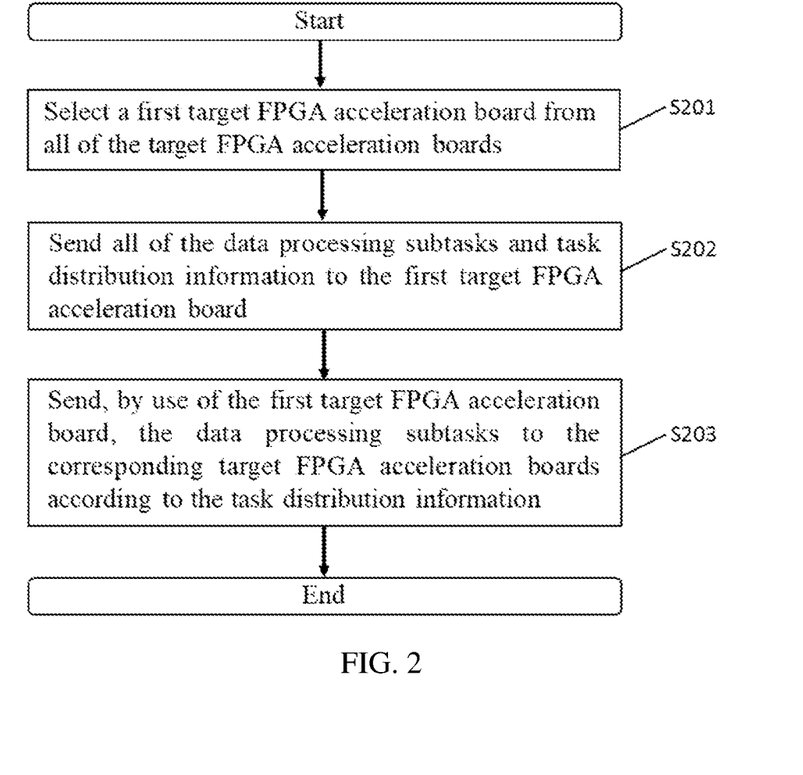
FIG. 2 is a flowchart of a method for distributing a data processing subtask according to an embodiment of the present application.

Referring to FIG. 2, FIG. 2 is a flowchart of a method for distributing a data processing subtask according to an embodiment of the present application. Further introductions after the determination of the data processing subtasks in the embodiment corresponding to FIG. 1 are made in the present embodiment. The present embodiment may be combined with the embodiment corresponding to FIG. 1 to obtain a further implementation mode. The present embodiment may include the following steps.

At S201, a first target FPGA acceleration board is selected from all of the target FPGA acceleration boards.

At S202, all of the data processing subtasks and task distribution information are sent to the first target FPGA acceleration board.

At S203, the data processing subtasks to the corresponding target FPGA acceleration boards are sent by use of the first target FPGA acceleration board according to the task distribution information.

An execution subject of the present embodiment may be the host side connected to the FPGA accelerator side. A first target FPGA acceleration board is determined from all of the selected target FPGA acceleration boards, so as to send all of the data processing subtasks to the first target FPGA acceleration board. The host side sends task distribution information to the first FPGA acceleration board while sending all of the data processing subtasks to the first target FPGA acceleration board. The task distribution information stores correspondences between the data processing subtasks and the target FPGA acceleration boards. The first target FPGA acceleration board may send the data processing subtasks to the corresponding target FPGA acceleration boards based on the correspondences.

Certainly, the host side may send the corresponding data processing subtask to each of the target FPGA acceleration boards, besides the operation of distributing all of the data processing subtasks by use of one target FPGA acceleration board, as described in the embodiment corresponding to FIG. 2. As a possible implementation mode, the host side may send the corresponding data processing subtask to the target FPGA acceleration board in a streaming or integral packet transmission mode.

Figure 3:
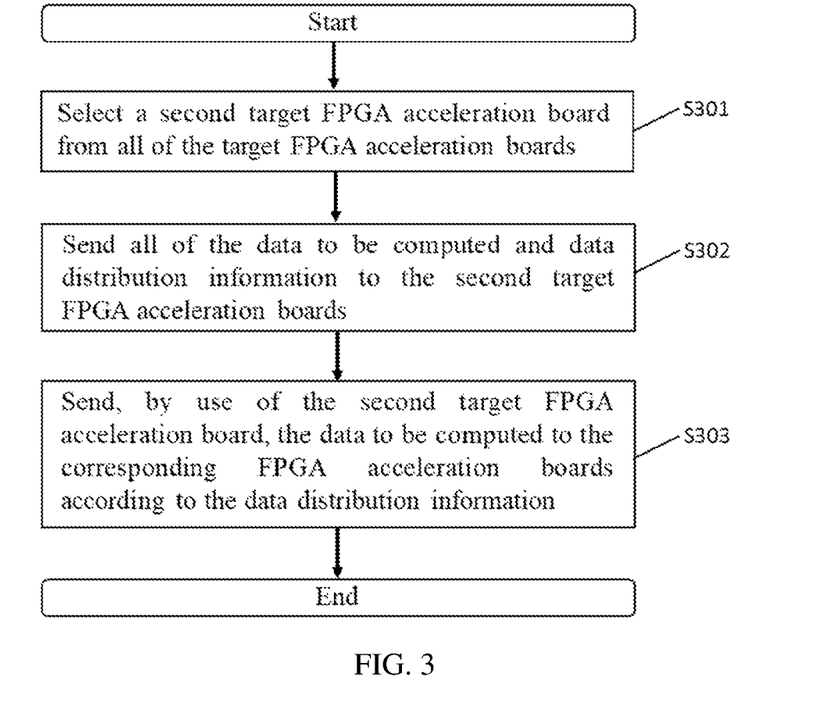
FIG. 3 is a flowchart of a method for sending data to be computed according to an embodiment of the present application.

Referring to FIG. 3, FIG. 3 is a flowchart of a method for sending data to be computed according to an embodiment of the present application. Further introductions about S103 in the embodiment corresponding to FIG. 1 are made in the present embodiment. The present embodiment may be combined with the embodiment corresponding to FIG. 1 to obtain a further implementation mode. The present embodiment may include the following steps.

In S301, a second target FPGA acceleration board is selected from all of the target FPGA acceleration boards.

In S302, all of the data to be computed and data distribution information are sent to the second target FPGA acceleration board. The data distribution information includes correspondences between the data to be computed and the target FPGA acceleration boards.

In S303, the data to be computed is sent to the corresponding FPGA acceleration boards by use of the second target FPGA acceleration board according to the data distribution information.

An execution subject of the present embodiment may be the host side connected to the FPGA accelerator side. A second target FPGA acceleration board is determined from all of the selected target FPGA acceleration boards, so as to send all of the data to be computed to the second target FPGA acceleration board. The host side sends data distribution information to the first FPGA acceleration board while sending all of the data processing subtasks to the first target FPGA acceleration board. The data distribution information stores the correspondence between each piece of the data to be computed and the target FPGA acceleration boards. The second target FPGA acceleration board may send the data to be computed to the corresponding target FPGA acceleration boards based on the correspondence. As a possible implementation mode, the host side may send the corresponding data to be computed to the target FPGA acceleration boards in a self-defined RDMA (Remote Direct Memory Access) transmission mode.

Further, when the host side and the target FPGA acceleration board are devices in a local area network, a packing operation is performed in a MAC layer on communication data (such as the data to be computed and/or the final processing result) between the host side and the target FPGA acceleration boards. When the host side and the target FPGA acceleration board are devices in a public network, a packing operation is performed in a UDP payload layer on communication data (such as the data to be computed and/or the final processing result) between the host side and the target FPGA acceleration board, and a packing operation is performed in the UDP payload layer on communication data (such as the data to be computed and/or the intermediate computing result) between the target FPGA acceleration boards. The payload layer refers to a UDP load layer, and load refers to information needed to be transmitted in data transmission.

Figure 4:
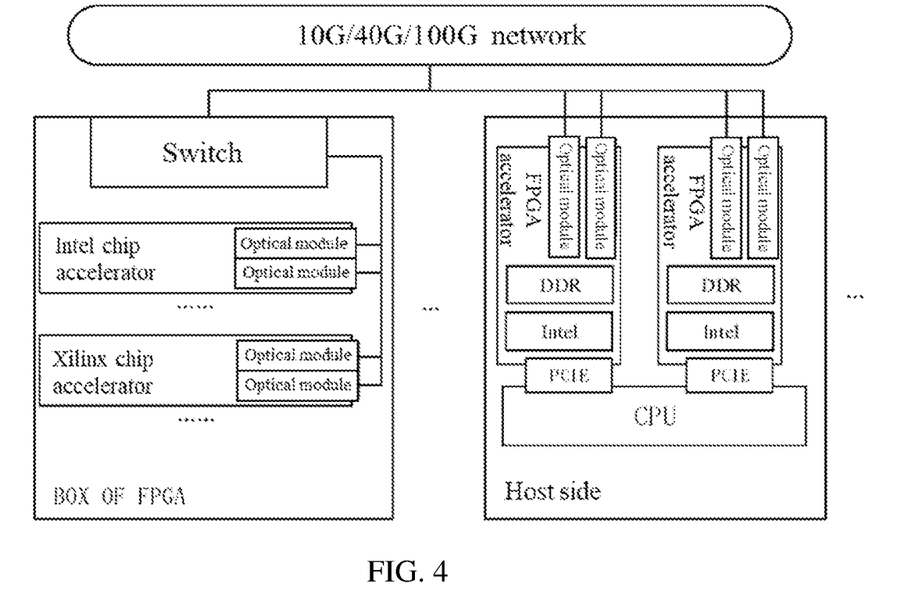
FIG. 4 is an architecture diagram of a Reconfigurable Data Center (RDC) according to an embodiment of the present application.

Referring to FIG. 4, FIG. 4 is an architecture diagram of an RDC according to an embodiment of the present application. The RDC may include a host side and a box of FPGA (i.e., an FPGA accelerator side). The RDC disclosed in the present embodiment pools FPGA resources based on a network. The FPGA acceleration boards are connected by the network (a 10G network, 40G network, or 100G network). On one hand, a machine-card binding form is retained, namely a server is provided with one or more FPGA accelerators. On the other hand, a BOX OF FPGA mode is introduced. Various types of FPGA acceleration boards (including Intel chip and a Xilinx chip) in the box of FPGA perform data interaction through the network. The FPGA acceleration boards in the box of FPGA are also interconnected with the FPGA acceleration boards provided at the host side through the network. In this manner, tight coupling between an FPGA and a CPU is released, and communication data needs not to be forwarded by the CPU of the host side, and may be transmitted by a MAC layer a lightweight high-reliability protocol above or a UDP, thus reducing the system throughput delay. Optical module in FIG. 4 is fiber interface module.

The RDC shown in FIG. 4 has the following characteristic: the CPU of the host side, the FPGA acceleration board in the host side, and the FPGA acceleration board in the box of FPGA work collaboratively. The CPU of the host side is responsible for logical processing. The FPGA acceleration board in the box of FPGA is responsible for communication-intensive and computation-intensive tasks. The RDC shares memory resources through the network, and a distributed topology is formed between nodes. A related logical function of a reconfigurable device is loaded in a distributed manner, and a standard Ethernet interface and protocol are supported.

Task division and scheduling, software pipelining construction, data communication, and other processing methods under a conventional CPU-based distributed platform cannot be applied to the RDC directly. For a parallel structure and reconfigurability of heterogeneous computation resources in the RDC, based on data flow programming, a distributed data flow programming framework oriented to the RDC in the present application provides a distributed parallel API to complete mapping from a computation task to a reconfigurable device. The distributed data flow programming framework consists of a CPU acceleration stack, an FPGA acceleration stack, and a mapping model.

The CPU acceleration stack provides a host-side API for parallel task model division and scheduling as well as an underlying support, and includes a lightweight high-reliability protocol module, an RDC internal memory management module, and an FPGA accelerator driver module.

The FPGA acceleration stack provides an Intellectual Property (IP) such as acceleration data control and kernel control for the implementation of a specific computation task, and the FPGA IP provides a completely same interface for a function that the host-side API may provide, thereby implementing a unified distributed multi-engine acceleration engine. Through the above-mentioned interface, the multi-engine acceleration stack mainly implements remote loading and updating of the FPGA, loading and offloading for an algorithm application in the FPGA, loading of an algorithm parameter, controlling of a data migration path, startup and termination of an application, etc., thereby achieving controlling each instruction of an FPGA cloud platform. The FPGA acceleration stack may provide an acceleration interface corresponding to the host-side API, and may further provide an acceleration data control program and a kernel control program during the execution of a data processing subtask. When the FPGA acceleration board executes the data processing subtask, the FPGA acceleration stack may implement data distribution and migration by use of the acceleration data control program, such that the FPGA acceleration board obtains original data needed to be processed and stores a data processing result in a specific region. The kernel control program refers to a kernel control program of the FPGA acceleration board. The FPGA acceleration stack may implement computation for the original data to obtain the corresponding data processing result by use of the kernel control program. When the distributed data flow programming framework is operating, the CPU acceleration stack divides a data processing task into a plurality of data processing subtasks, determines, in an FPGA accelerator side, a target FPGA acceleration board corresponding to each of the data processing subtasks, and sends data to be computed to the target FPGA acceleration board. The FPGA acceleration stack executes the corresponding data processing subtask by use of each of the target FPGA acceleration boards to obtain a data processing result, wherein the data processing result includes intermediate computing data or a final processing result of the data processing task, source data of each of the data processing subtasks includes the data to be computed and/or the intermediate computing data, and the intermediate computing data is transmitted by the network between the target FPGA acceleration boards. The FPGA acceleration stack may include a static region and an FPGA acceleration engine. The static region is configured to execute the data processing subtask distributed by the CPU acceleration stack, and is further configured to send the data processing result to the CPU acceleration stack or other target FPGA acceleration board. The FPGA acceleration engine is configured to send the data processing subtask to a local acceleration unit or an acceleration unit of other target FPGA acceleration board to perform an accelerated computation operation.

Figure 5:
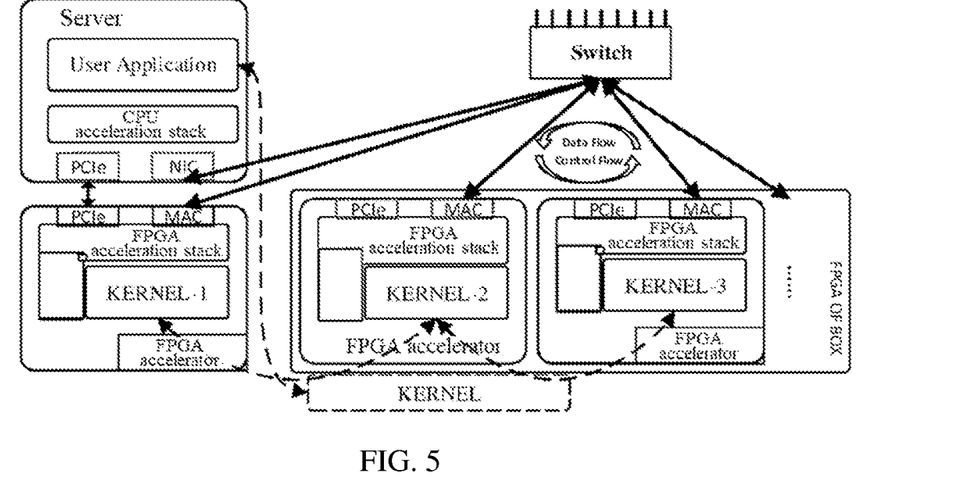
FIG. 5 is a diagram of an acceleration framework of an RDC according to an embodiment of the present application.

Referring to FIG. 5, FIG. 5 is a diagram of an acceleration framework of an RDC according to an embodiment of the present application. FPGA accelerator in FIG. 5 is the FPGA acceleration board mentioned herein. An FPGA-based distributed heterogeneous system may perform logical subnetwork division as required by a user. A whole subnetwork consists of a plurality of computation task nodes. Data transmission and communication based on control instructions are implemented between a server node and an FPGA acceleration unit and between FPGA nodes based on a self-defined lightweight high-reliability transmission protocol. Each computation task includes a logical control module running in the server node and an accelerated computation module running in the FPGA. The logical control module of the server node is implemented by an FPGA cloud platform function library provided by an extensible distributed programming framework. The accelerated computation module running in the FPGA is implemented by a Run-Time Library (RTL), and completes the parallel computation task of the RDC by use of an Internet Protocol (IP)-layer control interface provided by the distributed programming framework. In FIG. 5, NIC refers to a network card, User Application refers to a user application, PCIe refers to a high-speed serial computer extended bus standard, MAC refers to a medium access control protocol, KERNEL refers to a kernel of the FPGA acceleration board, FPGA OF BOX refers to an FPGA accelerator side with a plurality of FPGA acceleration boards, Data Flow refers to data flow transmission between the FPGA acceleration boards, Control Flow refers to a control process of each FGPA acceleration board by the FPGA accelerator side, and Switch refers to a switch.

Figure 6:
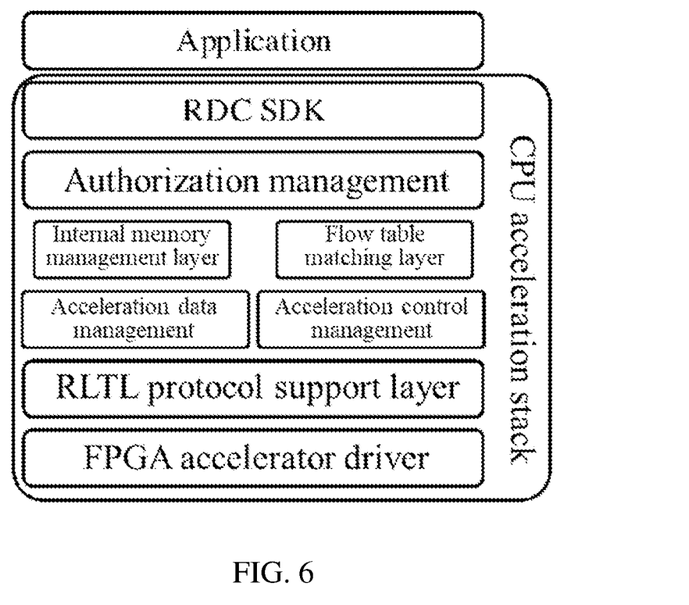
FIG. 6 is a schematic architecture diagram of a CPU acceleration stack according to an embodiment of the present application.

Referring to FIG. 6, FIG. 6 is a schematic architecture diagram of a CPU acceleration stack according to an embodiment of the present application. The CPU acceleration stack may be divided into an underlying FPGA accelerator driver module, a RDC Software Development Kit (RDC SDK), an authorization management module, an internal memory management layer, a flow table matching layer, an acceleration data management module, an acceleration control management module, and a Relay Layer-Transfer Layer (RLTL) protocol support layer. A user may complete application data migration, kernel updating, running monitoring, and other tasks through the RDC SDK. The authorization management module mainly completes an FPGA-based work group management and authorization mechanism according to different requirements of the user, and completes a chip-Identifier (ID)-based security checking mechanism, thereby improving the security of a netlist/BIT file of the user. The flow table matching module mainly parses a related content according to a protocol, and finds a matched related function model. Acceleration data and control management mainly completes management over a control flow and a data flow.

Referring to Table 1, Table 1 is a function description table of the RDC SDK. The present SDK supports the user to migrate data to a specified address of a Double Data Rate (DDR) memory by use of RDMA, perform PR (an operating system command), configure a kernel parameter, etc.

TABLE 1

Function Description Table of RDC SDK

| RDC-oriented SDK | Detailed function descriptions |
|---|---|
| icfTransterData | DDR address of the board specified by the user |
| icfTransterDataRDMA | RDMA migration interface |
| icfCreateProgramToFPGA | Interface for streaming loading of PR to FPGA |
| icfLoadProgramToFPGA | Instruction interface for loading of PR to FPGA |
| icfLoadProgramToFlash | Instruction interface for loading to Flash |
| icfConfigKernel | Kernel parameter configuration interface |
| icfConfig KernelReturn | Kernel return value configuration interface |
| icfStartKernel | Kernel startup interface |
| icfEndKernel | Kernel forced termination interface |

Figure 7:
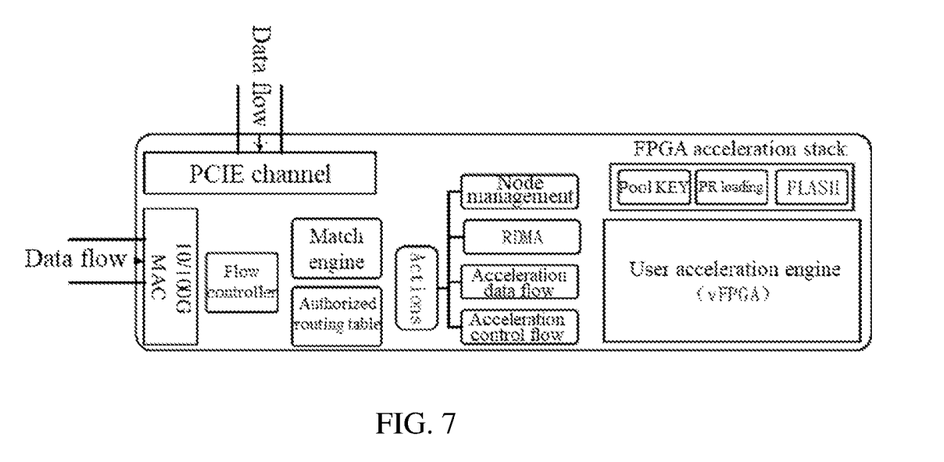
FIG. 7 is a functional structure diagram of an FPGA acceleration stack according to an embodiment of the present application.

Referring to FIG. 7, FIG. 7 is a functional structure diagram of an FPGA acceleration stack according to an embodiment of the present application. In FIG. 7, Match engine refers to a match engine configured to distribute a data flow, Actions refers to a control operation of the FPGA acceleration stack, RDMA refers to remote direct memory access, pool KEY refers to a key of a memory pool, PR loading refers to operating system command loading, FLASH refers to a flash memory, and vFPGA refers to a user acceleration engine. The acceleration stack of the FPGA acceleration board includes a static region and an FPGA acceleration engine. The static region is configured to execute a data computation instruction, perform information interaction with the host side, and provide a physical interface. The FPGA acceleration engine is configured to send data to be computed to an acceleration unit to perform an accelerated computation operation. The FPGA acceleration engine is configured to send the data to be computed through a PCIE interface to perform a local accelerated computation operation, and is further configured to send the data to be computed through the PCIE interface and a MAC interface to perform a remote accelerated computation operation. The static region performs data interaction with the FPGA acceleration engine through a target bus. The target bus includes any one or combination of BUSA, BUSC, BUSD, and BUSE.

The FPGA acceleration stack consists of a static region and a user application acceleration engine. The static part includes two parts, i.e., a control plane and a data plane. The control plane mainly cooperates with a host to complete routing, flow control, authorization, and other management functions, executes a control command transmitted by the host, and reports local information of the FPGA, thereby completing interactive processing with the host. The data plane mainly including various types of physical interfaces, including 10/100G MAC and PCIE channels, etc.

Specifically, the FPGA acceleration engine may send data to the acceleration unit through the PCIE interface for local acceleration, or output data to other board through a PCI-E→MAC interface for remote acceleration. The dynamically reconfigurable acceleration unit may implement remote dynamic reconfiguration by a PR technology. A route forwarding table of a route forwarding module is software-configurable. The route forwarding table is looked up in the FPGA to implement routing.

Figure 8:
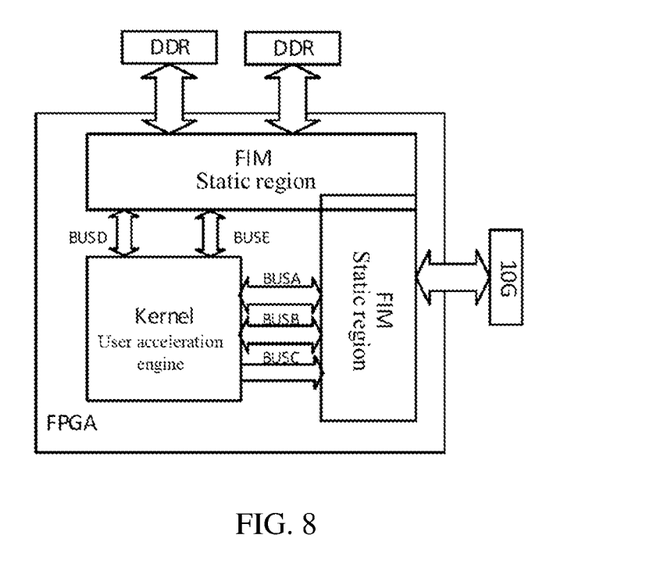
FIG. 8 is a framework diagram of an FPGA acceleration stack according to an embodiment of the present application.

Referring to FIG. 8, FIG. 8 is a framework diagram of an FPGA acceleration stack according to an embodiment of the present application. Table 2 is a function table of a fiber interface. The static region and user application acceleration engine shown in Table 2 interact through buses BUSA, BUSB, BUSC, BUSD, and BUSE. FIM in Table 2 refers to FPGA Interface Manager.

TABLE 2

Management Function Table of FPGA Interface

| | Bus type | Kernel | FIM | Function descriptions |
|---|---|---|---|---|
| BUSA | MM | MASTER | SLAVE | The kernel accesses DDRA through the FIM |
| BUSB | MM | MASTER | SLAVE | The kernel accesses DDRB through the FIM |
| BUSC | LOCAL BUS | MASTER | SLAVE | The kernel configures the other board register through the FIM |
| BUSD | MM | MASTER | SLAVE | The kernel configures the present board register through the FIM |
| BUSE | MM | SLAVE | MASTER | The FIM configures the kernel register |

The flow described in the above-mentioned embodiment will be described below with an embodiment in a practical application.

Figure 9:
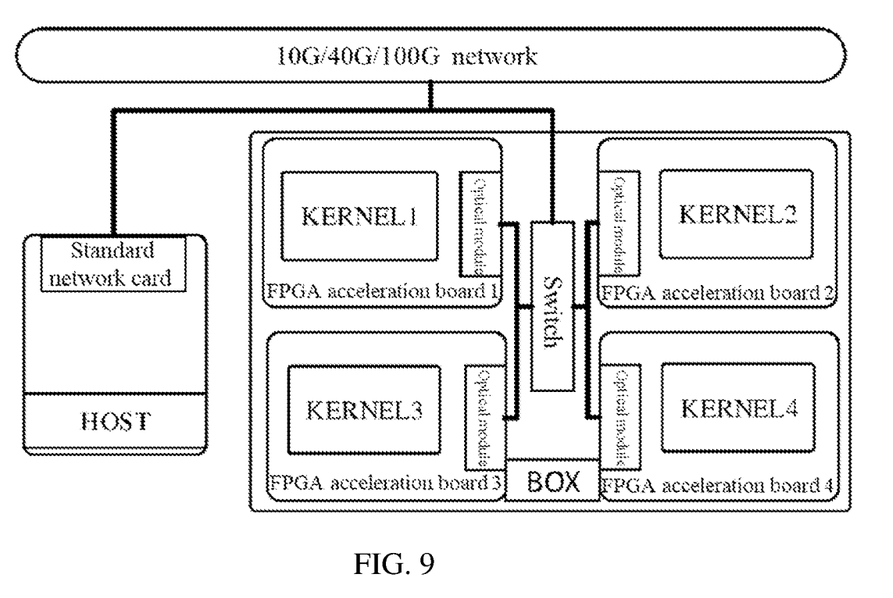
FIG. 9 is a schematic diagram of a computation principle of an FPGA cloud platform according to an embodiment of the present application.

This embodiment includes a host side used by a user. Four boards allocated to the user by an FPGA cloud platform are FPGA acceleration board 1 (referred to as FPGA 1 hereinafter for short), FPGA acceleration board 2 (referred to as FPGA 2 hereinafter for short), FPGA acceleration board 3 (referred to as FPGA 3 hereinafter for short), and FPGA acceleration board 4 (referred to as FPGA 4 hereinafter for short) respectively.

Kernels in the FPGA acceleration boards have the following main functions. Kernel 1 performs plus 1 and plus 2 operations on data a and b migrated from the host side respectively. Kernel 2 performs addition or subtraction or multiplication or division on a result of a plus 1 and data c migrated from the host side to FPGA 2. Kernel 3 performs addition or subtraction or multiplication or division on a result of b plus 2 and data d migrated from the host side to FPGA 3. Kernel 4 multiplies results output by Kernel 2 and Kernel 3, and an obtained result is sent to the host side.

A functional procedure of the example in the present embodiment is as follows. The host side migrates data a and b to FPGA 1 through a standard network card. Kernel 1 adds 1 to a, adds 2 to b, migrates the result of a plus 1 to FPGA 2, and migrates the result of b plus 2 to FPGA 3. The host side migrates data c and d to FPGA 2 and FPGA 3 respectively. Kernel 2 executes algorithm (+−*/optional) on (a+1) and c. Kernel 3 executes algorithm (+−*/optional) on (b+2) and d. The operation results are migrated to FPGA 4. Kernel 4 multiplies the results, and stores the result locally as required by the host side. A host migrates the operation result to the host side.

A computation process of the FPGA acceleration board in the embodiment corresponding to FIG. 9 is as follows.

Step 1: the host loads Kernel 1 to FPGA 1 in a streaming mode.
Standard interface: icfCreateProgramToFPGA( ).
Step 2: the host migrates aocx files of Kernel 2, Kernel 3, and Kernel 4 to FPGA 2 respectively.
Standard interface: icfTransterDataRDMA( ).
Step 3: the host sends an instruction to FPGA 2 to load Kernelif2 to FPGA 2.
Standard interface: icfLoadProgramToFPGA( ).
Step 4: FPGA 2 loads Kernel 1 to FPGA 3 in the streaming mode.
Standard interface: provided by an FPGA IP core.
Step 5: FPGA 2 migrates the aocx file of Kernel 4 to FPGA 2.
Standard interface: needs to be provided by the FPGA IP core.
Step 6: FPGA 2 sends an instruction to FPGA 4 to load Kernel 4 to FPGA 4.
Standard interface: needs to be provided by the FPGA IP core.

Steps 1 to 6 present an FPGA kernel loading process, including loading from the host side (steps 1 to 3 involve a host-side code) and loading from an FPGA side (steps 4 to 6 involve a project of FPGA 2).

Step 7: the host migrates data A to FPGA 1 in an RDMA mode.
Standard interface: icfTransterDataRDMA( ).
Step 8: the host migrates data B to FPGA 1 in a direct transmission mode.
Standard interface: icfTransterData( ).
Step 9: the host configures an address and data length of A in FPGA 1 to FPGA 1.
Standard interface: icfConfigKernelParam( ).
Step 10: the host configures an address and data length of B in FPGA 1 to FPGA 1.
Standard interface: icfConfigKernelParam( ).
Step 11: the host configures a storage address of a computation result A1 of Kernel 1-1 to FPGA 1.
Standard interface: icfConfigKernelReturn( ).
Step 12: the host configures a storage address of a computation result A2 of Kernel 1-2 to FPGA 1.
Standard interface: icfConfigKernelReturn( ).
Step 13: the host side starts Kernel 1-1.
Standard interface: icfStartKernel( ).
Step 14: the host side starts Kernel 1-2.
Standard interface: icfStartKernel( ).

In steps 7 to 14, the host side interacts with FPGA 1 by use of software application-layer interfaces, and controls FPGA 1 to start the kernel.

Step 15: FPGA 1 migrates A1 to FPGA 2 in the RDMA mode.
Standard interface: provided by the FPGA IP core.
Step 16: the host migrates data c to FPGA 2 in the RDMA mode.
Standard interface: icfTransterDataRDMA( ).
Step 17: FPGA 1 configures an address and data length of A1 in FPGA 2 to FPGA 2.
Standard interface: provided by the FPGA IP core.
Step 18: the host configures an address and data length of c in FPGA 2 to FPGA 2.
Standard interface: icfConfigKernelParam( ).
Step 19: FPGA 1 configures a storage address of a computation result A2 of Kernel 2 to FPGA 2.
Standard interface: needs to be provided by the FPGA IP core.
Step 20: FPGA 1 starts Kernel 2 of FPGA 2, and sends formal parameters A1 and c.
Standard interface: needs to be provided by the FPGA IP core.

In steps 15 to 20, FPGA 1 and the host interact with FPGA 2 by use of the provided interfaces, and FPGA 1 controls FPGA 2 to start the kernel.

Step 21: FPGA 1 migrates B1 to FPGA 3 in the direct transmission mode.
Step 22: the host migrates data d to FPGA 3 in the direct transmission mode.
Step 23: FPGA 1 configures an address and data length of B1 in FPGA 3 to FPGA 3.

Step 24: the host configures an address and data length of d in FPGA 3 to FPGA 3.

Step 25: FPGA 1 configures a storage address of a computation result B2 of Kernel 3 to FPGA 3.

Step 26: FPGA 1 starts Kernel 3 of FPGA 3, and sends formal parameters B1 and d.

Steps 21 to 26, FPGA 1 and the host interact with FPGA 3 by use of the provided interfaces, and FPGA 1 controls FPGA 3 to start the kernel.

Step 27: FPGA 2 migrates A2 to FPGA 4 in the RDMA mode.

Step 28: FPGA 3 migrates B2 to FPGA 4 in the direct transmission mode.

Step 29: FPGA 2 configures an address and data length of A2 in FPGA 4 to FPGA 4.

Step 30: FPGA 3 configures an address and data length of B2 in FPGA 4 to FPGA 4.

Step 31: FPGA 2 configures a storage address of a computation result AB3 of Kernel 4 to FPGA 4.

Step 32: FPGA 2 starts Kernel 4 of FPGA 4, and sends formal parameters A2 and B2.

Steps 27 to 32, FPGA 2 and FPGA 3 interact with FPGA 4 by use of the provided interfaces, and FPGA 2 controls FPGA 4 to start the kernel.

Step 33: FPGA 4 starts Kernel 3 of FPGA 3, and sends formal parameters B1 and d.

An embodiment of the present application also provides a data processing apparatus, connected to an FPGA accelerator side. The FPGA accelerator side includes a plurality of FPGA acceleration boards. The FPGA acceleration boards are connected through a network. The data processing apparatus includes:
- a task distribution module, configured for dividing a data processing task into a plurality of data processing subtasks, and determining, in the FPGA accelerator side, a target FPGA acceleration boards corresponding to each of the data processing subtasks; and
- a task execution module, configured for sending data to be computed to the target FPGA acceleration boards, and executing the corresponding data processing subtask by use of each of the target FPGA acceleration boards to obtain a data processing result, wherein the data processing result comprises intermediate computing data or a final processing result of the data processing task, source data of each of the data processing subtasks comprises the data to be computed and/or the intermediate computing data, and the intermediate computing data is transmitted through the network between the target FPGA acceleration boards.

According to the present embodiment, the data processing task is divided into the a plurality of data processing subtasks first. Then, the target FPGA acceleration boards corresponding to each of the data processing subtasks are determined in the FPGA accelerator side. The corresponding data processing subtask is executed by use of the target FPGA acceleration boards. When the target FPGA acceleration boards process the data processing subtask, the data processing result of other target FPGA acceleration boards may be taken as input data, and the data processing result computed by itself may also be sent to other target FPGA acceleration boards. The data processing result is transmitted between the target FPGA acceleration boards by the network rather than sent to the host side first and then forwarded by the host side. It can be seen that, according to the present embodiment, a physical limitation of host interfaces on the number of FPGA acceleration boards in an FPGA accelerator side may be avoided, thereby improving the data processing efficiency.

The embodiment of the apparatus part is in mutual correspondence with the embodiment of the method part. Therefore, the embodiment of the system part refers to the descriptions about the embodiment of the method part, and will not be elaborated temporarily herein.

The present application also provides a storage medium, having a computer program stored thereon which, when executed, may implement the steps provided in the above-mentioned embodiment. The storage medium may include various media capable of storing program codes such as a U disk, a mobile hard disk, a Read-Only Memory (ROM), a Random Access Memory (RAM), a magnetic disk, or an optical disk.

The present application also provides an electronic device, which may include a memory and a processor. The memory stores a computer program. The processor, when calling the computer program in the memory, may implement the steps provided in the above-mentioned embodiment. Certainly, the electronic device may further include various network interfaces, a power supply, and other components.

All the embodiments in this specification are described in a progressive manner. Contents mainly described in each embodiment are different from those described in other embodiments. Same or similar parts of all the embodiments refer to each other. For the system disclosed in the embodiments, since it corresponds to the method disclosed in the embodiments, the description is relatively simple, and the relevant part can be referred to the description of the method part. It should be noted that for a person of ordinary skill in the art, several improvements and modifications can be made to the present application without departing from the principle of the present application, and these improvements and modifications also fall within the scope of protection of the claims of the present application.

It is also noted that in this specification, relationship terms such as first and second are used only to distinguish one entity or operation from another entity or operation, without necessarily requiring or implying any such actual relationship or order between those entities or operations. Further, the terms "include" "comprise" or any other variation thereof are intended to cover non-exclusive inclusion, such that a process, method, article, or apparatus that includes a set of elements includes not only those elements, but also other elements not expressly listed, or also include elements that are inherent to such process, method, article, or apparatus. With no more restrictions, an element defined by statement "including a/an" does not exclude the existence of the same other elements in a process, method, object, or device including the element.

The invention claimed is:

1. A data processing method, for applying to a host side, wherein the host side is connected to a Field Programmable Gate Array (FPGA) accelerator side, the FPGA accelerator side comprises a plurality of FPGA acceleration boards, and the plurality of FPGA acceleration boards are connected to each other through a network, the data processing method comprises:
dividing, by the host side, a data processing task into a plurality of data processing subtasks, and determining target FPGA acceleration boards in the FPGA accelerator side corresponding to each of the plurality of data processing subtasks;

selecting a first target FPGA acceleration board and a second target FPGA acceleration board from all of the target FPGA acceleration boards;

sending all of the plurality of data processing subtasks and task distribution information to the first target FPGA acceleration board, and sending all of data to be computed and data distribution information to the second target FPGA acceleration board: wherein the task distribution information comprises correspondences between the plurality of data processing subtasks and the target FPGA acceleration boards, and the data distribution information comprises correspondences between the data to be computed and the target FPGA acceleration boards;

sending, by the first target FPGA acceleration board, the plurality of data processing subtasks to corresponding target FPGA acceleration boards according to the task distribution information, and sending, by the second target FPGA acceleration board, the data to be computed to corresponding FPGA acceleration boards according to the data distribution information; and executing a corresponding data processing subtask of the plurality of data processing subtasks by each of the target FPGA acceleration boards to obtain a data processing result, wherein the data processing result comprises intermediate computing data or a final processing result of the data processing task, source data of each of the plurality of data processing subtasks comprises at least one of the data to be computed or the intermediate computing data, and the intermediate computing data is transmitted through the network between the target FPGA acceleration boards.

2. The data processing method of claim 1, wherein after the sending, by the second target FPGA acceleration board, the data to be computed to corresponding FPGA acceleration boards according to the data distribution information, the method further comprises:

configuring a data address and data length of the data to be computed into the target FPGA acceleration boards, whereby the target FPGA acceleration boards store the data to be computed according to the data address and the data length.

3. The data processing method of claim 1, further comprising:

configuring a computation result storage address into the target FPGA acceleration boards, whereby the target FPGA acceleration boards store at least one of the intermediate computing data or the final processing result into the computation result storage address.

4. The data processing method of claim 1, wherein the sending, by the second target FPGA acceleration board, the data to be computed to corresponding FPGA acceleration boards according to the data distribution information comprises:

sending corresponding data to be computed to the target FPGA acceleration boards in a self-defined Remote Direct Memory Access (RDMA) transmission mode; and correspondingly, the method further comprises:
sending the corresponding data processing subtask to the target FPGA acceleration boards in a preset transmission mode; wherein the preset transmission mode comprises streaming or integral packet transmission.

5. The data processing method of claim 1, further comprising:

when the target FPGA acceleration boards send the intermediate computing data to other target FPGA acceleration boards based on the network, sending a data address and data length of the intermediate computing data to the other target FPGA acceleration boards, whereby the other target FPGA acceleration boards store the intermediate computing data according to the data address and the data length of the intermediate computing data.

6. The data processing method of claim 1, wherein data is transmitted between the target FPGA acceleration boards by a Medium Access Control (MAC) interface; data is transmitted between the host side and the target FPGA acceleration boards by a Peripheral Component Interconnect Express (PCIE) interface; and data is transmitted between a remote device and the target FPGA acceleration boards by a second MAC interface.

7. The data processing method of claim 1, wherein when the host side and the target FPGA acceleration boards are devices in a local area network, a packing operation is performed in a Medium Access Control (MAC) layer on communication data between the host side and the target FPGA acceleration boards; and when the host side and the target FPGA acceleration boards are devices in a public network, a second packing operation is performed in a User Datagram Protocol (UDP) payload layer on the communication data between the host side and the target FPGA acceleration boards, and a third packing operation is performed in the UDP payload layer on communication data between the target FPGA acceleration boards.

8. A non-transitory computer readable medium comprising computer readable program code that when executed by a processor enables the processor to execute a distributed data flow programming framework, comprising a Central Processing Unit (CPU) acceleration stack and a Field Programmable Gate Array (FPGA) acceleration stack;

the CPU acceleration stack is configured to provide an underlying support for dividing a data processing task, and is further configured to provide a host-side Application Programming Interface (API) for scheduling a data processing subtask;

the FPGA acceleration stack is configured to provide an acceleration interface corresponding to the host-side API, and is further configured to provide an acceleration data control program and a kernel control program during execution of the data processing subtask;

wherein when the distributed data flow programming framework is operating, the CPU acceleration stack divides the data processing task into a plurality of data processing subtasks, and determines target FPGA acceleration boards in an FPGA accelerator side corresponding to each of the plurality of data processing subtasks; selects a first target FPGA acceleration board and a second target FPGA acceleration board from all of the target FPGA acceleration boards; sends all of the plurality of data processing subtasks and task distribution information to the first target FPGA acceleration board, and sends all of data to be computed and data distribution information to the second target FPGA acceleration board; wherein the task distribution information comprises correspondences between the plurality of data processing subtasks and the target FPGA acceleration boards, and the data distribution information comprises correspondences between the data to be computed and the target FPGA acceleration boards; the first target FPGA acceleration board sends the plurality of data processing subtasks to corresponding target FPGA acceleration boards according to the task distribution information, and the second target FPGA acceleration board sends the data to be computed to corresponding FPGA acceleration boards according to the data distribution information; and the FPGA acceleration stack executes a corresponding data processing subtask of the plurality of data processing subtasks by use of each of the target FPGA acceleration boards to obtain a data processing result, wherein the data processing result comprises intermediate computing data or a final processing result of the data processing task, source data of each of the plurality of data processing subtasks comprises at least one of the data to be computed or the intermediate computing data, and the intermediate computing data is transmitted through a network between the target FPGA acceleration boards.

9. The non-transitory computer readable medium of claim 8, wherein the FPGA acceleration stack comprises:
   a static region, configured to execute the plurality of data processing subtasks distributed by the CPU acceleration stack, and further configured to send the data processing result to the CPU acceleration stack or another target FPGA acceleration board; and
   an FPGA acceleration engine, configured to send the plurality of data processing subtasks to a local acceleration unit or an acceleration unit of other target FPGA acceleration boards to perform an accelerated computation operation.

10. An electronic device, comprising a memory and a processor, wherein the memory has a computer program thereon; and the processor, when calling the computer program in the memory, implements steps of a data processing method, wherein the data processing method comprises:
   dividing, by a host side, a data processing task into a plurality of data processing subtasks, and determining target Field Programmable Gate Array (FPGA) acceleration boards in an FPGA accelerator side corresponding to each of the plurality of data processing subtasks;
   selecting a first target FPGA acceleration board and a second target FPGA acceleration board from all of the target FPGA acceleration boards;
   sending all of the plurality of data processing subtasks and task distribution information to the first target FPGA acceleration board, and sending all of data to be computed and data distribution information to the second target FPGA acceleration board; wherein the task distribution information comprises correspondences between the plurality of data processing subtasks and the target FPGA acceleration boards, and the data distribution information comprises correspondences between the data to be computed and the target FPGA acceleration boards;
   sending, by the first target FPGA acceleration board, the plurality of data processing subtasks to corresponding target FPGA acceleration boards according to the task distribution information, and sending, by the second target FPGA acceleration board, the data to be computed to corresponding FPGA acceleration boards according to the data distribution information; and
   executing a corresponding data processing subtask of the plurality of data processing subtasks by each of the target FPGA acceleration boards to obtain a data processing result, wherein the data processing result comprises intermediate computing data or a final processing result of the data processing task, source data of each of the plurality of data processing subtasks comprises at least one of the data to be computed or the intermediate computing data, and the intermediate computing data is transmitted through a network between the target FPGA acceleration boards.

11. The electronic device of claim 10, wherein after the sending, by the second target FPGA acceleration board, the data to be computed to corresponding FPGA acceleration boards according to the data distribution information, the method further comprises:
   configuring a data address and data length of the data to be computed into the target FPGA acceleration boards, whereby the target FPGA acceleration boards store the data to be computed according to the data address and the data length.

12. The electronic device of claim 10, wherein the data processing method further comprises:
   configuring a computation result storage address into the target FPGA acceleration boards, whereby the target FPGA acceleration boards store at least one of the intermediate computing data or the final processing result into the computation result storage address.

13. The electronic device of claim 10, wherein the sending, by the second target FPGA acceleration board, the data to be computed to corresponding FPGA acceleration boards according to the data distribution information comprises:
   sending the corresponding data to be computed to the target FPGA acceleration boards in a self-defined Remote Direct Memory Access (RDMA) transmission mode; and
   correspondingly, the method further comprises:
   sending the corresponding data processing subtask to the target FPGA acceleration boards in a preset transmission mode; wherein the preset transmission mode comprises streaming or integral packet transmission.

14. The electronic device of claim 10, wherein the data processing method further comprises:
   when the target FPGA acceleration boards send the intermediate computing data to other target FPGA acceleration boards based on the network, sending a data address and data length of the intermediate computing data to the other target FPGA acceleration boards, whereby the other target FPGA acceleration boards store the intermediate computing data according to the data address and the data length of the intermediate computing data.

15. The electronic device of claim 10, wherein data is transmitted between the target FPGA acceleration boards by a Medium Access Control (MAC) interface; data is transmitted between the host side and the target FPGA acceleration boards by a Peripheral Component Interconnect Express (PCIE) interface; and data is transmitted between a remote device and the target FPGA acceleration boards by a second MAC interface.

16. The electronic device of claim 10, wherein when the host side and the target FPGA acceleration boards are devices in a local area network, a packing operation is performed in a Medium Access Control (MAC) layer on communication data between the host side and the target FPGA acceleration boards; and
   when the host side and the target FPGA acceleration boards are devices in a public network, a second packing operation is performed in a User Datagram Protocol (UDP) payload layer on the communication data between the host side and the target FPGA acceleration boards, and a third packing operation is performed in the UDP payload layer on communication data between the target FPGA acceleration boards.

* * * * *